United States Patent [19]

Duncan et al.

[11] Patent Number: 5,502,761
[45] Date of Patent: Mar. 26, 1996

[54] APPARATUS AND METHOD FOR RELAYING CALLING INFORMATION TO A PAGER OR ALTERNATE TELEPHONE

[75] Inventors: Michael G. Duncan; Pamela P. Saegert, both of Austin; Gordon D. Ford, Round Rock, all of Tex.

[73] Assignee: Rolm Company, Santa Clara, Calif.

[21] Appl. No.: 217,468

[22] Filed: Mar. 24, 1994

[51] Int. Cl.$^6$ .......................... H04M 1/56; H04M 11/00
[52] U.S. Cl. ............................................. 379/142; 379/57
[58] Field of Search ...................... 379/142, 211, 379/212, 57, 67, 209, 156, 210, 70, 74, 79, 82, 89, 102

[56] References Cited

U.S. PATENT DOCUMENTS

| | | | |
|---|---|---|---|
| 4,072,824 | 2/1978 | Phillips | 379/57 |
| 4,443,664 | 4/1984 | Gange | 379/142 |
| 4,672,660 | 6/1987 | Curtin | 379/142 |
| 4,737,979 | 4/1988 | Hashimoto | 379/82 |
| 4,942,598 | 7/1990 | Davis | 379/57 |
| 4,961,216 | 10/1990 | Baehr et al. | 379/57 |
| 5,128,980 | 7/1992 | Choi | 379/56 |
| 5,327,486 | 7/1994 | Wolff et al. | 379/96 |

FOREIGN PATENT DOCUMENTS 3184452  12/1991  Japan ........................ 379/209

*Primary Examiner*—Stephen Chin
*Assistant Examiner*—Kevin Kim

[57] ABSTRACT

Method and apparatus for relaying calling information such as Automatic Number Information (ANI) in a public or private telephone network. The calling information is relayed from a base telephone to a remote receiver (pager or telephone) in a one step process. A caller is given an option via voice prompts to automatically relay the calling information by pressing a specified button on the telephone keypad. The caller is not required to acquire and dial the remote receiver number, or input the calling party telephone number. The calling information is automatically read back to the caller, wherein the caller is prompted to verify the number by pressing another specified button. The voice prompts may be in the called party's preprogrammed voice or in a computer generated voice. Method and apparatus is implemented in digital or analog telephone networks.

16 Claims, 3 Drawing Sheets

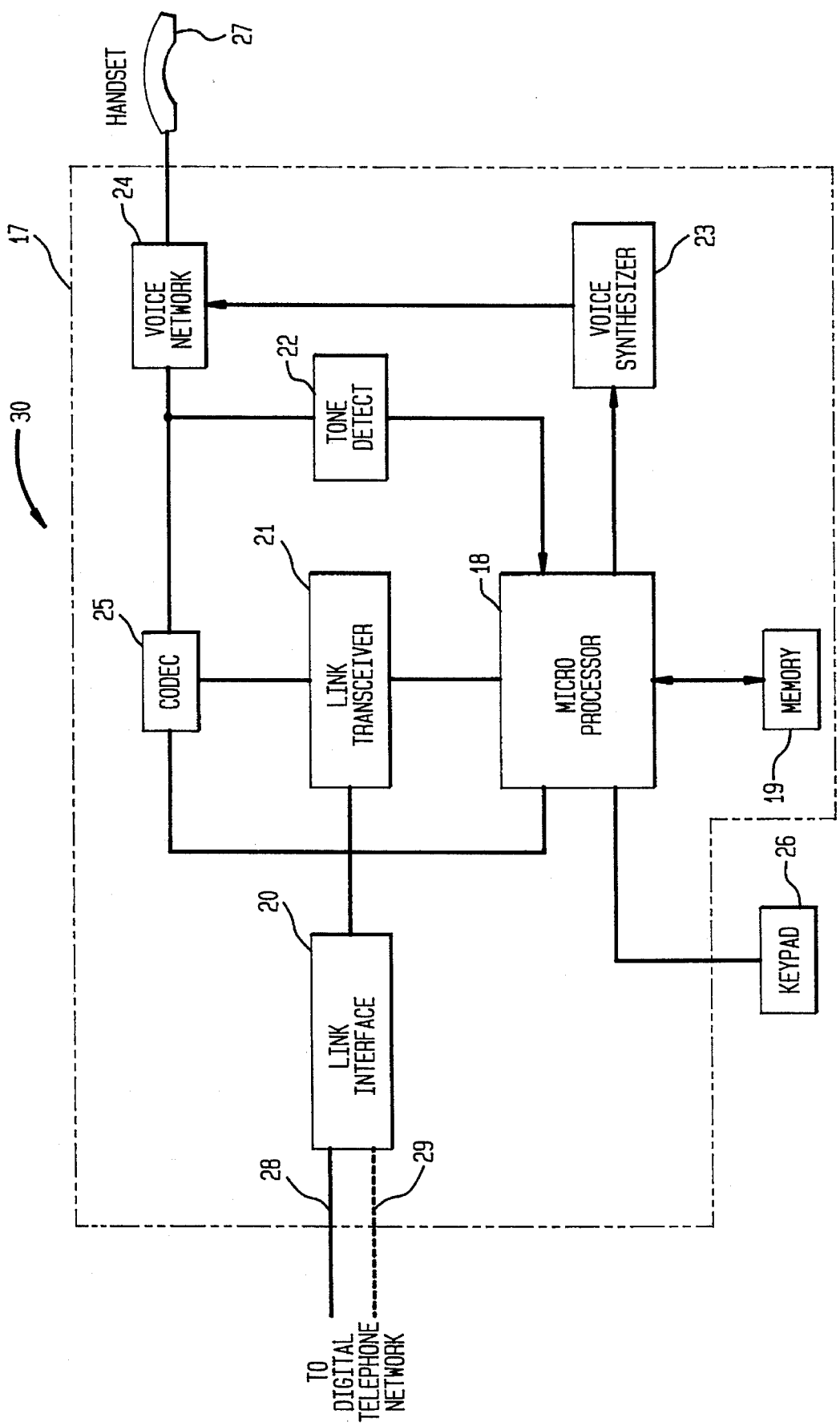

1

APPARATUS AND METHOD FOR RELAYING CALLING INFORMATION TO A PAGER OR ALTERNATE TELEPHONE

TECHNICAL FIELD

This invention relates to electronic communication systems and more particularly to a method and apparatus for electronically relaying calling information such as a calling party's telephone number in a one step process to a called party who is away from his base telephone, but who has access to a pager or alternate telephone.

BACKGROUND OF THE INVENTION

Telephone owners who are away from their base home or business telephone currently have several alternatives to determine whether calling parties have called the base phone, and to retrieve calling information such as the calling parties' telephone numbers. One such system is a telephone answering machine, in which a calling party can leave a recorded message. Some of the machines have a feature in which the telephone owner who is away from his base phone, can call in to his answering machine and hear the recorded messages by inputting a special code. However, if a calling party is in an emergency situation, and urgently needs to get in touch with the owner, (as for example, if the owner is a physician) then he or she won't be able to do so immediately but instead must wait for the owner to periodically call in to his answering machine.

Other systems employ digital pagers, in which the calling party acquires the number of the owner's pager, and then calls the pager number and enters the calling party's telephone number. The disadvantage of these systems is that the caller may need to place a call to the owner's base phone, and listen to a message reciting the number for the pager. He would then have to either memorize the pager number or write it down, place a call to the pager, enter his or her own telephone number receiving no verification that the number was entered correctly. This process is difficult and time consuming for a person in an emergency situation.

Another prior art system involves the use of voice pagers, in which a calling party may leave a voice message with the owner of the pager who is receiving the message. The disadvantage of this system is that the voice quality of the orally delivered message is very poor. Moreover, if the pager owner doesn't comprehend the message the first time it is transmitted, then he must wait until the calling party decides to try calling the pager again. There is also no verification to the calling party that he or she entered the pager number correctly.

One system that affords some automatic communication capability is call forwarding, in which calls to a base phone are automatically transferred directly to the remote phone. The problem with call forwarding, however, is that non-emergency phone calls are directly forwarded to the remote phone as well as emergency calls. Thus there is no discretion on the part of the owner to decline or accept a particular call. In addition, the base phone becomes tied up during a call forwarded communication, thereby preventing other callers from leaving messages.

Thus there is a need to overcome the conventional problems and time delays facing an emergency caller attempting to contact a telephone owner who is away from his or her base phone. There is a need for a system which gives the calling party, via a simple command on the telephone keypad, an option to have calling information directly relayed, from the called party's base phone to his remote pager or phone, without requiring the calling party to acquire, store and/or dial another phone number.

There is also a need to immediately verify to the calling party that the calling information being relayed is correct. The present invention provides such a system.

SUMMARY OF THE INVENTION

The present invention relates to a method and apparatus for relaying calling information in a public or private telephone network. A calling party who is attempting to telephone a called party (user) at the user's base telephone, hears voice prompts which give him an option to automatically relay calling information (such as the calling party's telephone number) to the user at a remote telephone or pager location. The information is relayed from the base phone to the remote phone by a simple command from the calling party and without the calling party having to acquire and/or dial another telephone number, or input the entire calling party telephone number on the keypad. The invention can be implemented in a digital or analog phone. In a private or public telephone network, it would function with a feature that automatically transfers calling information from a calling party to a user's base telephone, such as the calling party ID (CPID) or Automatic Number Identification (ANI) features currently available. The base telephone includes a Call Information Relay Device (CIRD) which can be programmed to take over the operation of the phone to implement the call information relaying features in accordance with the teachings of this invention.

When the calling party (caller) calls the user's base telephone, the caller is first given an option via voice prompts as to whether he would like the calling information automatically relayed. The voice prompts may be either in the user's preprogrammed voice or in a computer generated voice. The caller responds with a desire to relay the calling information by pressing a single button on the telephone keypad. The calling information to be relayed is then announced to the caller, who verifies it by pressing another button, and hangs up. The calling information is then automatically relayed to the user at the preprogrammed remote receiver (pager or telephone). At a remote telephone, the calling information is provided to the called party as computer generated speech. At a pager, it is provided in a format to allow digital readout of the information. If the remote receiver is busy, the apparatus waits a preset amount of time, and then tries again to deliver the information. When successfully relayed, the user may then immediately call back the caller at the caller's telephone number as determined from the relayed calling information. Thus the invention allows calling information to be automatically relayed in a one step process.

The apparatus may be connected to either one or two external telephone lines. The two telephone line embodiment allows the apparatus to communicate with a second calling party who calls during the time the apparatus is relaying calling information obtained from a first calling party.

BRIEF DESCRIPTION OF THE DRAWINGS

FIG. 3 is a block diagram for implementation of a digital version of the preferred embodiment.

DETAILED DESCRIPTION OF THE DRAWINGS

I. Operation Flow Chart

Figure 1:
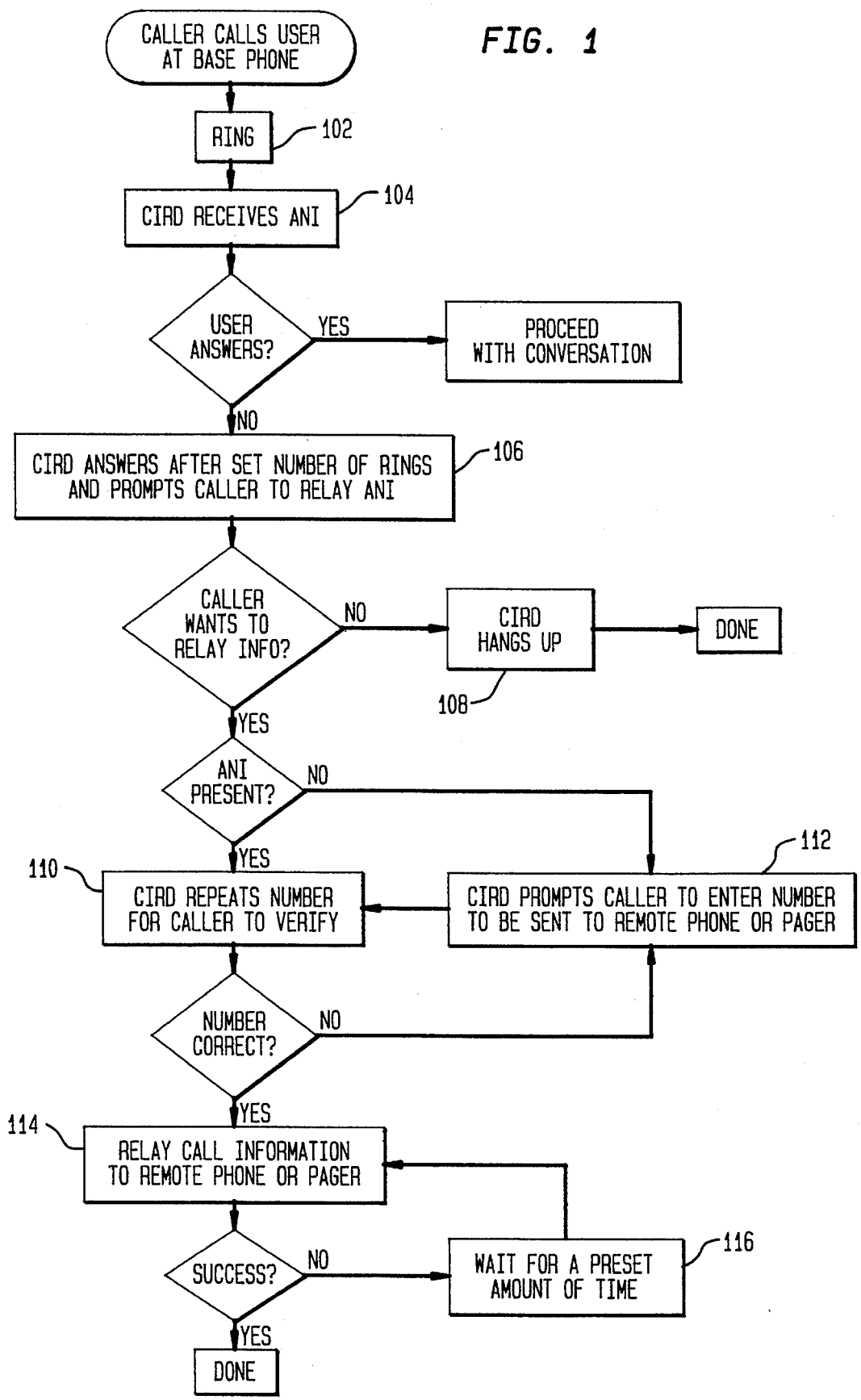
FIG. 1 is a flow chart showing the operation of either an analog or digital version of the invention.

The operation of the invention is illustrated by the flowchart of FIG. 1. The steps of FIG. 1 are applicable if the called party (user) has programmed the base telephone to relay calling information such as Calling Party ID (CPID) or Automatic Number Information (ANI) to a remote telephone or pager. When the user has completed programming the telephone as such, the telephone is said to be in the "CIRD Relay Mode", where "CIRD" is the acronym for "Call Information Relay Device". The CIRD is the device incorporated within the telephone that performs the relaying function in accordance with the teachings of this invention. Analog and digital embodiments of the CIRD are more fully described in FIGS. 2 and 3.

The process begins when a calling party telephones the user at the base telephone. When the base phone receives the call, the phone rings (step 102) and the CIRD, which is set up to receive the incoming call, receives the calling information (exemplified hereinafter by ANI) in step 104. The telephone can be programmed so as to display the ANI and/or to store it for later retrieval by the user.

If the user is present at the base telephone and answers it, notwithstanding that the CIRD Relay Mode has been implemented, the user proceeds with the conversation and ANI is not relayed. If the user does not answer after a predetermined number of rings, the CIRD answers in step 106 and prompts the caller with voice information to press a specific button on the caller's keypad if the caller wants the ANI relayed to the user's remote receiver, which may be a pager or alternate telephone. If the caller does not want the ANI relayed, he responds with a different prompt or hangs up, in which case the CIRD hangs up in step 108.

If the caller prompts to have the ANI relayed, and if the AIII is present, the CIRD repeats the caller's number for the caller to verify with another prompt in step 110. If the ANI is not present due to a code error, telephone network malfunction or otherwise, then in step 112, the CIRD prompts the caller to enter on the telephone keypad his or her phone number to be relayed to the user's remote receiver. In this case the CIRD then repeats step 110, prompting the caller to verify that the number entered is correct. If the caller responds with a command indicating that the number entered is incorrect or the caller wants to be called at a different number, the CIRD repeats steps 112 and 110.

If the number is verified, then in step 114, the CIRD relays the ANI to the user's remote receiver. If the CIRD detects that the ANI was not received by the receiver, as in the case where the receiver is busy, then in step 116 the CIRD waits for a preset amount of time, and then tries again in step 114. The CIRD will repeat steps 116 and 114 until the receiver receives the ANI. While the remote receiver is busy and the CIRD is waiting for the preset amount of time in step 116, the CIRD allows other callers to telephone the base phone and to respond to the CIRD prompts of steps 102–112. When the remote receiver is no longer busy, ANI's will be relayed to the remote receiver in the order that the CIRD acquired them.

II. Analog Embodiment

Figure 2:
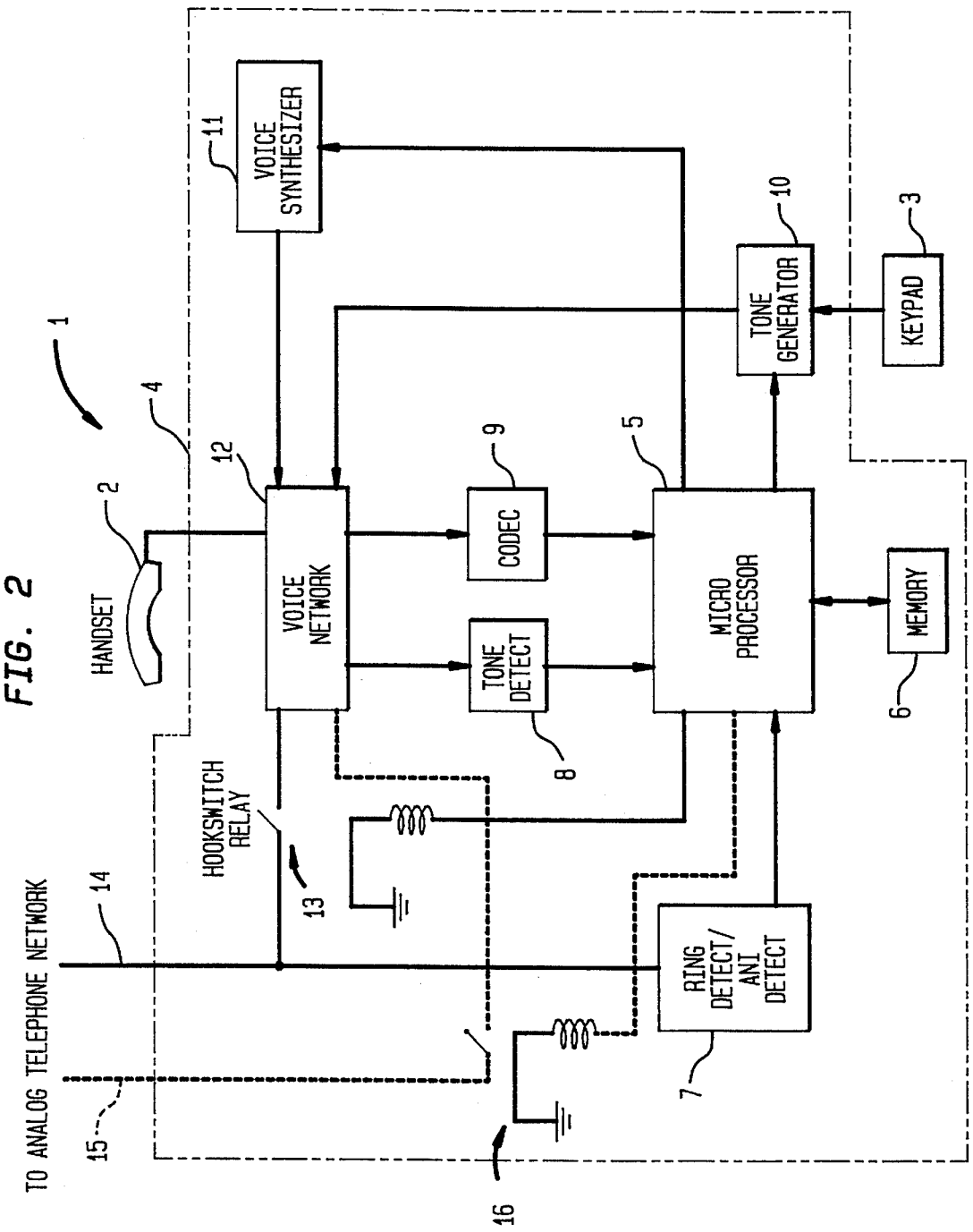
FIG. 2 is a block diagram for implementation of an analog version of the preferred embodiment.

A simplified block diagram of an analog embodiment of the invention is shown in FIG. 2. A base telephone 1 includes a handset 2, a keypad 3, and a Call Information Relay Device (CIRD) 4. Included within the CIRD 4 is a microprocessor 5 which stores information in a memory 6, a ring detect/ANI detect circuit 7 connected to an external first analog telephone line 14, a tone detect block 8, a coder/decoder (CODEC) block 9, a tone generate block 10, a voice synthesizer 11, a voice network 12, and a hookswitch relay 13 connected to the first analog telephone line 14.

The user programs the CIRD 4 to selectively relay incoming calling information to a remote receiver (pager or alternate telephone). When a specified key on the keypad 3 is pressed, the CIRD 4 is put into the "CIRD Program Mode" wherein programming instructions are entered by the user. Once in the CIRD Program Mode, the display of the phone will be driven by the CIRD 4. Information on the display assists the user during the programming operation. To further facilitate the programming operation, the user may press a specified key on the keypad 3 to enable the microprocessor 5 to guide the user by generating voice prompts via the voice synthesizer 11, voice network 12 and handset 2.

The user programs the remote pager or telephone number by entering a fixed key pattern corresponding to the remote number on the keypad 3. In response to a voice prompt or otherwise, the user also inputs the remote receiver type (i.e. phone or pager) by pressing a particular key or keys. The user also programs whether he would like the voice instructions to the prospective calling parties to be in the user's voice or in a computer generated voice. If the user's voice is chosen, the user puts in the voice instructions (prompts) by speaking into the handset 2. The CODEC 9 digitizes the user's voice instructions and sends the digitized information to the microprocessor 5 which stores it in the memory 6 for later retrieval.

When the user completes his programming instructions, the call relaying process can be initiated by pressing another specified key on the keypad 3 to put the CIRD 4 in the "CIRD Relay Mode". Once the CIRD Relay Mode is initiated, the ring detect/ANI detect circuit 7 will intercept the calling information (hereinafter exemplified as ANI) of an incoming call and send it to the microprocessor 5. The microprocessor 5 then stores the ANI in the memory 6. After a preprogrammed set number of rings, the microprocessor 5 will take over the operation of the telephone. The microprocessor 5 then sends coded signals to the voice synthesizer 11 to generate and transmit preprogrammed voice prompts via the voice network 12 to the calling party (caller). The voice prompts to the caller will instruct the caller to press a specified button on the caller's telephone keypad if he or she would like his or her telephone number automatically relayed to the called party who is at a remote pager or phone location. The caller may also be prompted to press a different button to leave a recorded message instead of relaying the telephone number. The voice prompts may be in the voice of the called part recorded during the programming process, as discussed above. Alternatively, the voice prompts may be in the form of a computer generated voice generated by the voice synthesizer 11.

When the caller responds with a desire to relay by pressing the specified button, the microprocessor receives the response in the form of a coded signal and sends a command to the voice synthesizer 11 directing the synthesizer 11 to "read back" the ANI stored in the memory by generating voice information corresponding to the stored ANI. This voice information is transmitted via the voice network 12 back to the calling party along with another voice prompt instructing the calling party to press a second specified button to verify that the voice information correctly states the caller's telephone number. The voice prompt will also instruct the caller to press a third specified button if the voice information does not correctly state the caller's telephone number.

If the caller presses the second specified button thereby verifying his or her telephone number, the microprocessor 5 receives the code indicating same from the caller's telephone. The microprocessor 5 then takes over the operation of the telephone line 14 by sending a command to the hookswitch relay 13 and retrieves the preprogrammed remote receiver number stored in the memory 6. The microprocessor 5 sends a command to the tone generate circuit 10 which then generates DTMF tones for the microprocessor 5 to call the remote receiver number. The ring detect block 7 and the tone detect block 8 allow the microprocessor to monitor call state. If the user's preprogrammed input indicates that the remote receiver is a pager, the microprocessor 5 will forward the stored ANI via the hookswitch relay 13 in appropriate code format to allow the pager to digitally display the ANI. If the remote receiver was programmed to be a telephone, the microprocessor 5 will send a command to the voice synthesizer 11 to transmit the ANI as a computer generated voice via the voice network 12 to the user at the remote phone.

The user can also program the CIRD 4 to allow him to call in from a remote phone to the base phone, input a special code and retrieve stored ANI. In this case the microprocessor 5 will transmit the stored ANI via the voice synthesizer 11 and voice network 12 to the remote phone. In accordance with the user's programmed instructions to the CIRD 4, the ANI may consist only of the ANI of callers who opted to have their calls relayed. Alternatively, the transmitted ANI may further comprise the ANI's of callers who have not opted to have their ANI's relayed. In either case, the most recently relayed ANI will be transmitted to the user first, to allow the user to immediately verify the same.

An optional second analog telephone line 15 may be connected to the voice network 12 through an optional hookswitch relay 16. In this embodiment, the call from the CIRD 4 to the remote receiver is transmitted on the second phone line 15 and incoming calls from calling parties to the base telephone are transmitted via the first phone line 14. This way, if a second calling party calls during the timeframe wherein the CIRD 4 is relaying ANI from a prior incoming call, the second calling party will not hear a busy signal. Rather, the CIRD 4 will answer the second call via the first phone line 14 and generate voice prompts to the second caller in substantially the same manner as it does when it is not simultaneously relaying ANI from a prior call.

III. Digital Embodiment

A digital embodiment of the invention, shown in FIG. 3., would be implemented in a digital telephone system such as Integrated Services Digital Network (ISDN) or ROLM link. A digital telephone 30 includes a Call Information Relay Device (CIRD) 17, a keypad 26 and a handset 27. The CIRD 17 includes a microprocessor 18 which stores information in a memory 19, a voice synthesizer 23 to generate voice information via a voice network 24, a link interface 20 which connects the telephone to an external first digital telephone line 28 and to an external second optional digital telephone line 29, a link transceiver 21, a coder/decoder (CODEC) 25 and a tone detect circuit 22.

The operation of the digital embodiment of FIG. 3 is similar to that of the analog embodiment of FIG. 2 discussed hereinabove. All of the user operational features described in the analog embodiment, such as computer generated voice prompts, user voice store, user retrieval of stored ANI's, ANI verification to calling party and CIRD Program Mode features are likewise implemented in the digital embodiment, but are of course accomplished in a digital telephone component environment.

The user programs the CIRD 17 via the keypad 26 to selectively relay calling information to a remote receiver number. The user may program the CIRD 17 to have the voice prompts communicated to prospective calling parties in the user's voice. This is accomplished as the user inputs the voice instructions by speaking into the handset 27. The voice network 24 then transduces the speech into a form suitable for the CODEC 25 to digitize it. The CODEC 25 then sends the digitized speech signals via the link transceiver 21 to the microprocessor 18 which stores it in the memory 19.

When the user completes his programming instructions and initiates the CIRD Relay Mode, incoming calling information (hereinafter exemplified as ANI) is obtained by the link transceiver 21 from the control channel of the digital telephone line 28 and through the link interface 20. The link transceiver 21 sends the received ANI to the microprocessor 18 which stores it in the memory 19. After a preprogrammed number of rings, the microprocessor 18 begins the ANI relaying process by sending a command to the voice synthesizer 23 to generate voice prompts to the caller. The generated voice prompts are transduced by the voice network 24, digitized by the CODEC 25 and transmitted to the caller via the link transceiver 21, link interface 20 and digital phone line 28. When the caller responds to the voice prompts by pressing specified keys on the caller's telephone keypad, the microprocessor receives the coded information corresponding to the caller's responses through the link transceiver 21. If a desire to relay calling information is indicated and the caller verifies the telephone number, the microprocessor initiates a call through the link transceiver 21 to relay the calling information to the preprogrammed remote receiver number. If the remote receiver is programmed to be a telephone, the microprocessor sends a command to the voice synthesizer 23 to generate speech information corresponding to the verified ANI, which is transmitted out the phone line 28 via the voice network 24, CODEC 25, and link transceiver 21 in the same manner as the above-discussed voice prompts were transmitted. If the remote receiver is a pager, the microprocessor relays the ANI through the link transceiver 21 in appropriate format to allow a digital readout of the ANI on the pager's display. If the telephone 16 is equipped for connection to the optional telephone line 29, the relayed call will be made on the line 29 while the CIRD can continue to receive incoming calls on the line 28.

The tone detect circuit 22 functions to detect inband call progress tones, such as DTMF tones, in order to monitor call state. This detected call status information is sent to the microprocessor 18 which needs it to initiate calls to the remote receiver. The tone generate block 10 of FIG. 2 is not required because all outgoing call control is handled digitally through the link transceiver 21.

From the foregoing, disclosed is an apparatus and method for relaying calling information to a pager or alternate telephone. The technical advantage of such a feature is that a calling party can opt to automatically relay his or her telephone number to the called party's remote pager or alternate telephone number without having to acquire and/or dial the remote pager number or alternate telephone number. The calling information is relayed upon a simple command by the calling party. An additional advantage realized by the invention is that the calling party telephone number is read back for the calling party to verify via another simple command. Yet another technical advantage is that a second calling party can receive voice prompts to relay and verify calling information of the second party while calling information of a first calling party is being relayed.

Now that the invention has been described by way of the preferred embodiments, various enhancements and improvements which do not depart from the scope and spirit of the invention will become apparent to those of skill in the art. Thus, it should be understood that the preferred embodiments have been provided by way of example and not by way of limitation. The scope of the invention is defined by the appended claims.

What is claimed is:

1. An apparatus for use in a base telephone used in a public or private telephone network, the public or private network operative to transfer calling information identifying a calling party, said calling information including the telephone number of said calling party when said calling party calls a called party at said base telephone, said apparatus adapted to connect to a first telephone line and a second telephone line comprising:

a receiver adapted to receive said calling information at said telephone over the first telephone line, said calling information being received in a format selected from a group including digital and analog formats;

a memory for storing said calling information;

means for generating telephony voice prompts;

means for transmitting said voice prompts to the calling party when said telephone is not answered after a predetermined number of rings, wherein said voice prompts inform the calling party that the calling party, by pressing specific button on the calling party's telephone, will cause said calling information to be automatically relayed to the called party at a remote receiver;

means responsive to said pressing of said specific button for disconnecting said calling party from said receiver and relaying said calling information stored in said memory to said remote receiver over the second telephone line while concurrently freeing said first telephone line to receive independent calling information from a second calling party for storage by said memory, wherein said independent calling information from said second calling party can be simultaneously received over the first telephone line as said calling information from a first calling party is relayed to said remote receiver over the second telephone line.

2. The apparatus of claim 1 wherein said remote receiver is a paging device.

3. The apparatus of claim 1 wherein said remote receiver is an alternate telephone.

4. The apparatus of claim 1 further comprising:

means for detecting whether said remote receiver received said calling information;

means for waiting a predetermined period of time if said detection means detects that said remote receiver did not receive said calling information, whereupon said relaying means again relays said calling information to said remote receiver.

5. The apparatus of claim 1 further comprising programming means whereupon a user programs a telephone number of said remote receiver.

6. The apparatus of claim 1 further comprising programming means enabling said voice prompts to be in the voice of a user.

7. The apparatus of claim 1 wherein said voice prompts are in the voice of a computer generated voice.

8. The apparatus of claim 1, wherein said second calling party receives voice prompts from said apparatus at the same time that said apparatus is relaying previously verified calling information of a prior calling party to said remote receiver.

9. The apparatus of claim 1 further comprising means to relay stored calling information to a user calling said base telephone from a different telephone, wherein said stored calling information is relayed upon said user inputting a preprogrammed special code on keypad of said different telephone.

10. A method for receiving and relaying calling information identifying a first calling party in a public or private telephone network, said calling information including the telephone number of said first calling party, said method comprising the steps of:

receiving said calling information at a called party's base telephone adapted to connect to a first telephone line and a second telephone line when said first calling party telephones the called party at said base telephone over the first telephone line;

storing said calling information in a memory;

generating telephony voice prompts;

transmitting said voice prompts to said first calling party, said voice prompts prompting said first calling party to press a specific button on the first calling party telephone if said first calling party wants to automatically relay said calling information to said called party at a predetermined remote receiver;

disconnecting said first calling party from the first telephone line and relaying said stored calling information over the second telephone line to said called party when said first calling party presses said specific button; and while relaying said stored calling information, enabling reception and storage, via said first telephone line, of second calling information that is independent of said calling information from said first calling, such that said second calling information from a second calling party can be simultaneously received over the first telephone line as said calling information from said first calling party is relayed to said remote receiver over the second telephone line.

11. The method of claim 10 wherein said calling information is received at said base telephone in a digital format.

12. The method of claim 10 wherein said calling information is received at said base telephone in an analog format.

13. The method of claim 10 wherein said remote receiver is a paging device.

14. The method of claim 10 wherein said remote receiver is an alternate telephone.

15. A method for relaying calling information identifying a calling party employing a calling party telephone having a keypad in a public or private telephone network, said calling information including the telephone number of said calling party, said method comprising the steps of:

receiving said calling information at a called party's base telephone when said calling party telephones the called party at said base telephone;

storing said calling information in a memory;

generating telephony voice prompts;

transmitting said voice prompts to said calling party, said voice prompts prompting said calling party to press a first specified button on said calling party telephone if said calling party wants to automatically relay said calling information to said called party at a predetermined remote receiver;

generating telephony voice information indicative of said calling information received;

transmitting said voice information to said calling party;

prompting said calling party to generate a verification that said transmitted voice information correctly identifies the calling party telephone number, wherein said verification is generated by said calling party pressing a second specified button;

relaying said stored calling information to said called party at said remote receiver upon said calling party pressing said second specified button; and simultaneously with said step of relaying said stored calling information, enabling reception and storage of independent calling information from a second calling party.

16. The method of claim 15, further comprising the steps of:

prompting said calling party to generate a negative response if said transmitted voice information does not correctly identify said calling party telephone number, wherein said negative response is generated by pressing a third specified button;

prompting said calling party, upon the generation of said negative response, to input a corrected calling party telephone number on said calling party telephone keypad by pressing digits corresponding to said corrected calling party number;

generating speech indicative of said corrected calling party input;

transmitting said speech to said calling party;

prompting said calling party to generate a positive response indicating that said speech correctly identifies said calling party telephone number, wherein said positive response is generated by pressing a fourth specified button on said calling party telephone;

relaying said corrected calling party telephone number to the called party at said predetermined remote receiver upon said calling party pressing said fourth specified button.

\* \* \* \* \*